Figure 1:
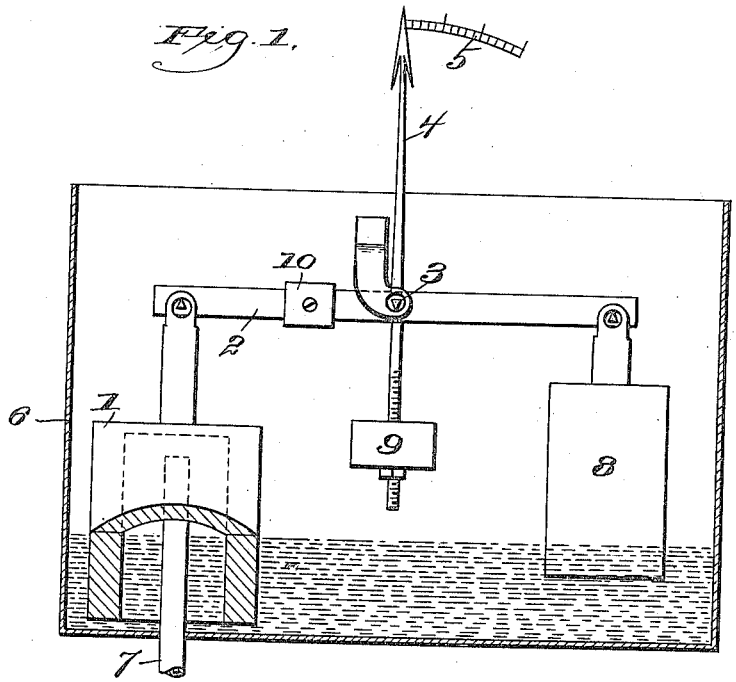

E. G. BAILEY.
PRESSURE GAGE.
APPLICATION FILED APR. 30, 1913.

1,192,599.

Patented July 25, 1916.
2 SHEETS—SHEET 1.

Witnesses:
Jas. J. Maloney.

Inventor.
Ervin G. Bailey.
by
Atty.

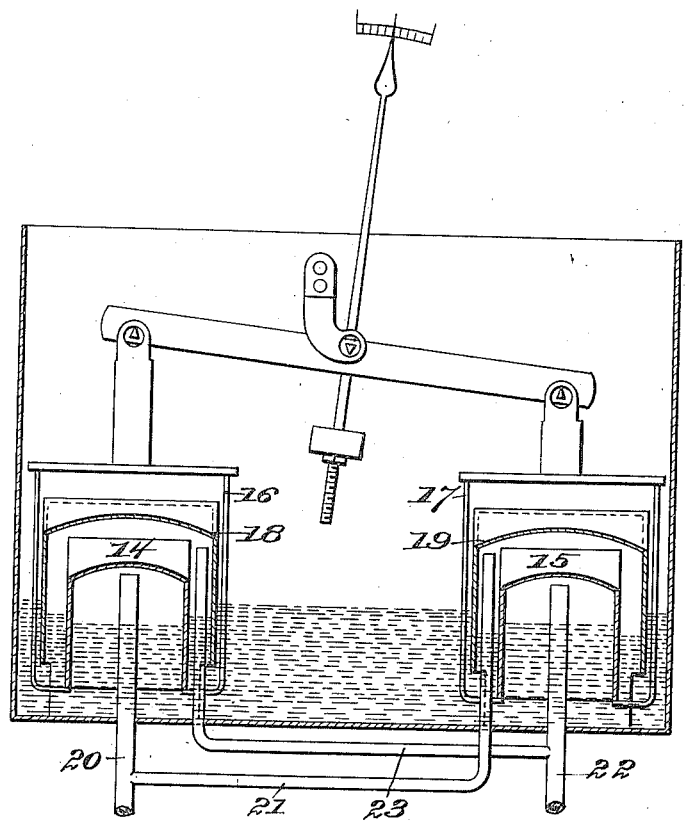

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

PRESSURE-GAGE.

1,192,599.   Specification of Letters Patent.   Patented July 25, 1916.

Application filed April 30, 1913. Serial No. 764,501.

*To all whom it may concern:*

Be it known that I, ERVIN G. BAILEY, a citizen of the United States, residing in Newton Highlands, in the county of Middlesex and State of Massachusetts, have invented an Improvement in Pressure-Gages, of which the following description, in connection with the accompanying drawings, is a specification, like letters on the drawings representing like parts.

The present invention relates to a pressure gage, and is embodied in a gage of that type in which the pressure to be indicated acts upon a bell sealed in liquid, being opposed by a measurable force which is brought into action by the movement of the bell, such, for example, as the force due to the change of buoyancy.

In accordance with the invention, the instrument is so arranged that the force due to change of buoyancy is not affected by the change of level of the liquid in which the bell is sealed, so that any loss of liquid due to evaporation or leakage will not affect the accuracy of the gage.

Furthermore, the instrument embodying the invention is so constructed that friction is eliminated by dispensing with guides for the moving parts, etc., so that much smaller pressures or differences in pressures can be accurately indicated than is the case with instruments now commonly in use.

In measuring the intensity of any single pressure, it is really the difference in intensity between the pressure to be measured and that of the atmosphere surrounding the working parts of the measuring instrument that is indicated, so that under all circumstances at least two pressures act upon the instrument, one of which may be atmospheric pressure.

If the difference between two pressures is to be measured, independently of the atmospheric pressure, the working parts may be inclosed in a pressure-tight chamber, and one pressure admitted to said chamber to act upon the outside of the bell, while the other pressure is admitted to the space within the bell, as would result in inclosing the casing, or by putting a suitable hood over the bell.

In carrying out the invention, the pressure receiving liquid sealed bell is connected with an oscillating indicating member at one side of the axis of oscillation of said member and balanced by a displacing member in the same liquid and also connected with said oscillating member at the opposite side of the axis of oscillation thereof. The horizontal cross-sectional area of the walls of the bell is equal to the horizontal cross-sectional area of the walls of the displacing member, so that the lifting effect due to buoyancy on one member is equal to that acting on the other member regardless of the actual level of the liquid. This is a valuable feature of the invention for the reason that changes in the level of the liquid due to leakage or evaporation do not affect the accuracy of the instrument. When pressure is applied to the bell the bell moves and its movement is resisted by the force of gravity due to the decreased buoyancy of the bell, and the increased buoyancy of the balancing displacing member, as well as by the change in the moments of force around the axis of the beam. In cases where the difference between two pressures is to be measured, the displacing member may be in the form of another bell which is adapted to be acted upon by the other pressure, or the bell may be inclosed in a pressure tight chamber, and one pressure admitted inside of the bell, and the other outside thereof, utilizing the displacing member as first described. With this construction, the bell and the displacing member, as well as the beam itself, can be hung on knife-edged joints, thereby almost entirely eliminating friction, and the variation in the moments of force due to the oscillation of the beam can readily be varied by means of an adjustable weight.

Figure 2:
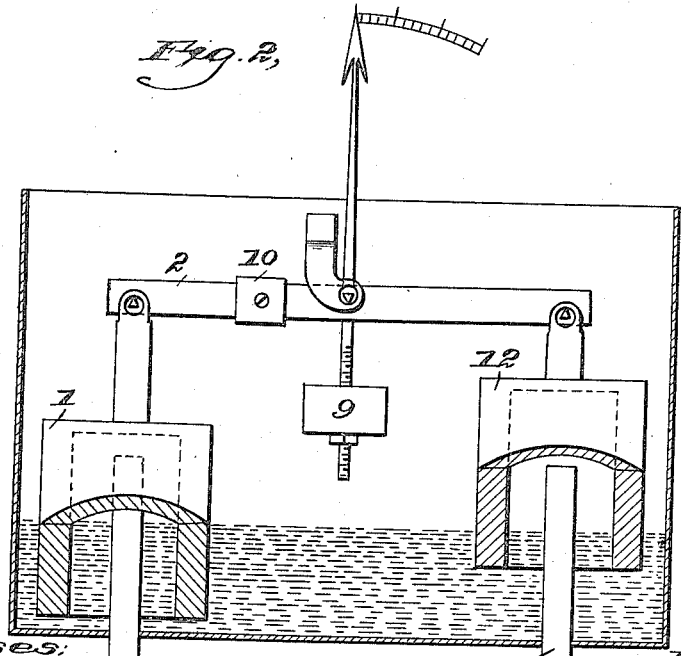

Figure 1 is an elevation, partly in section, of an instrument embodying the invention, the receptacle for the sealing liquid and part of the bell being shown in section; and Figs. 2 and 3 are similar views showing modifications.

In all the instruments shown to illustrate the invention, the prime factor in the operation consists of an inverted bell 1 hung from a beam 2 which has a pivotal support at 3 and carries an indicating member 4 which is adapted to travel with relation to a scale 5, or with relation to a chart, if a pen record is to be made. The bell 1 is sealed in liquid contained in a receptacle 6 and is adapted to receive pressure inside, as through a pipe 7.

The instrument shown in Fig. 1 is adapted for use when the intensity of a single pressure with relation to atmospheric pressure is to be indicated or recorded, and, in this case, the force of gravity acting downward on the bell is opposed by the force of gravity of a displacing member 8 which also extends into the liquid in the casing 6, and the cross-sectional area of the said displacing member is shown as the same as the cross sectional area of the walls of the bell, so that the actual level of the liquid does not enter into or affect the operation. To bring about this result, the cross sectional areas of the bell and displacing member must be inversely proportional to their respective moment arms, and, in the instrument shown, the moment arms are equal and the cross-sectional areas of the bell and displacing member are, therefore, equal. But if, for any reason, these moment arms were to be made unequal, the cross-sectional areas would be modified accordingly to meet the requirement above stated. In the construction shown, the beam 2 is pivoted substantially at the middle, the bell 1 being at one side of the axis, and the displacing member 8 at the opposite side thereof. As the pressure to be measured acts on the bell, assuming the said pressure to be greater than atmospheric pressure, it will tend to lift the bell in opposition to the increasing force of gravity due to the decrease buoyancy of the bell, while the force of gravity acting on the displacing member becomes less as its buoyancy increases. The forces thus opposing the pressure within the bell bring about a state of equilibrium at the end of a certain movement of the beam, so that the position of the pointer or its equivalent at the end of such movement is an indication of the intensity of pressure acting on the bell. The bell and displacing member are so constructed that the motion of the indicating member per unit pressure is fixed for any specific gravity of liquid used. In order to provide the instrument with means for adjustment for the correction of errors which may occur in the construction of the bell or displacing member, or to accommodate the same instrument for use with liquids of different densities, or to change the range of motion per unit pressure, the beam is shown as provided with an adjusting weight 9 hung below, and movable toward and from, the pivot 3, the movement of said weight as the beam oscillates on its pivot introducing a moment of force opposed to the movement of the bell, this moment varying with the vertical position of the said weight 9. The beam is further provided with an adjusting weight 10 which can be moved toward or from the pivot 3, so as to bring about a state of perfect balance when no pressure is applied to the instrument, and when the indicator is at the zero position on the scale.

In the construction shown in Fig. 2, the instrument is adapted for use in indicating or recording the difference between two pressures, and, in this case, the displacing member 8 is replaced by a pressure receiving bell 12 which is adapted to receive pressure through a pipe 13, the pressures in the said bells thus being opposed to each other, so that the movement of the beam is an indication of a preponderance of one pressure over the other. In this case, each bell constitutes the displacing member for the other, and the cross sectional area of the walls of one bell is the same as that of the other; also the inside areas of the two bells are equal when connected with equal moment arms, so that it is immaterial what the liquid level may be if the instrument is properly adjusted in other respects.

A further modification is shown in Fig. 3, which illustrates an instrument designed for extremely accurate measurements. In this instrument, both bells are inclosed by hoods, and the greater of two pressures acts on the inside of one bell and on the outside of the other bell, while the lesser of said pressures acts on the outside of the bell first named, and on the inside of the other. As shown in Fig. 3, the bells 14 and 15 are hung upon yokes 16 and 17, and are closed above by hoods 18 and 19, which are sealed at the bottom in the liquid which seals the bells. The hoods 18 and 19 are shown as cylindrical the open lower ends of the hoods resting on the bottom of the main receptacle the walls of the hoods having lateral recesses for the ends of the yokes 16 and 17 the edges of the said recesses being indicated by full and dotted vertical lines below those portions of the hoods which are shown in section. One pressure is conducted through the pipe 20 and branch 21 to the spaces inside of the bell 14 and the outside of the bell 15; and the other pressure is conducted through the pipe 22 and branch 23 to the space inside of the bell 15 and the space outside of the bell 14. The principal advantages of this modified instrument over the others shown are that it has a greater effective area for the pressure to act upon in a casing of the same size, and causes only a very slight change in the load upon the pivots which support the bells. In this instrument, as in all the instruments shown, the pressure difference is balanced partly by the change in buoyancy of the bells and displacing member, and partly by moments brought into play by motion of the beam, such as that of the weight 24 attached to the beam. It is perfectly obvious that any equivalent for the weight might be used, or any arrangement or device capable of progressively varying the moments of force in response to the movement of the parts; and in some cases it may be better to utilize only the change in buoyancy. The use of a vertically adjustable weight, however, makes it possible to change readily the relation between the motion of the indicator and the pressure difference which is being measured, and the weight constitutes a simple and convenient device.

What I claim is:

1. In a pressure gage the combination with a bell partially submerged in and sealed by a liquid, of a pivotally supported beam to which said bell is pivotally connected at one side of the axis of said beam; means for subjecting the interior and exterior of said bell respectively, to pressures, the difference between which is to be measured; and a displacing member pivotally connected to said beam at the other side of the axis thereof, and partially submerged in and sealed by the same liquid, the horizontal cross-sectional areas of the walls of said bell and of said displacing member being inversely proportional to the moment arms through which the said bell and displacing member act respectively.

2. The combination with an oscillating indicating member; of two bells connected with said indicating member at opposite sides of the axis of oscillation thereof, the horizontal cross-sectional areas of the walls of said bells being inversely proportional to the lengths of the moment arms through which they act respectively, and the said bells being partially submerged in and sealed by the same liquid; means for inclosing the exterior surface of said bells and means for admitting pressures, the difference between which is to be measured, to the inclosed interior and exterior surfaces of said bells respectively.

3. The combination with a pivotally supported oscillating member; of two bells suspended from said member at opposite sides of the axis thereof, the horizontal cross-sectional areas of the walls of said bells being inversely proportional to their respective moment arms, and the said bells being partially submerged in and sealed by a liquid; and means for admitting pressures, the difference between which is to be measured, to the interior surfaces of said bells respectively.

In testimony whereof, I have signed my name to this specification in the presence of two subscribing witnesses.

ERVIN G. BAILEY.

Witnesses:
JAS. J. MALONEY,
W. E. COVENEY.